United States Patent
Hess et al.

[15] 3,642,458
[45] Feb. 15, 1972

[54] COKE-MAKING PROCESS AND COKE FUEL PRODUCED BY SAME

[72] Inventors: Howard V. Hess, Glenham; Edward L. Cole, Fishkill, both of N.Y.

[73] Assignee: Texaco Inc., New York, N.Y.

[22] Filed: Aug. 22, 1969

[21] Appl. No.: 852,436

Related U.S. Application Data

[63] Continuation-in-part of Ser. No. 780,078, Nov. 29, 1968.

[52] U.S. Cl. ..........................................44/15, 44/1, 44/23, 44/24
[51] Int. Cl. .............................................................C10l 5/12
[58] Field of Search..........................44/1, 10, 15, 17, 24, 23

[56] References Cited

UNITED STATES PATENTS

| | | | |
|---|---|---|---|
| 2,801,168 | 7/1957 | Goddard | 44/1 R X |
| 3,322,550 | 5/1967 | Murphy | 44/10 X |
| 3,356,470 | 12/1967 | Klink | 44/15 |
| 3,402,031 | 9/1968 | Schick et al | 44/17 X |

*Primary Examiner*—Daniel E. Wyman
*Assistant Examiner*—C. F. Dees
*Attorney*—K. E. Kavanagh and Thomas H. Whaley

[57] ABSTRACT

Coke is made from wastes such as fruit and vegetable peels, sawdust, straw, newsprint and whey liquid by decarboxylating and carbonizing these materials in the liquid aqueous phase under pressure. The coke produced is light and fluffy, easy to ignite and has a sulfur content below 0.5 percent by weight, a density of about 1.3 percent, a hydrogen content of at least 4.9 percent weight percent, a high-oxygen content, and a surface area ranging from 8 to 26 sq. meters per gram. These properties make the coke particularly useful in the manufacture of charcoal briquets, as fuel for orchard heating and wherever it is desired to avoid air pollution.

4 Claims, 1 Drawing Figure

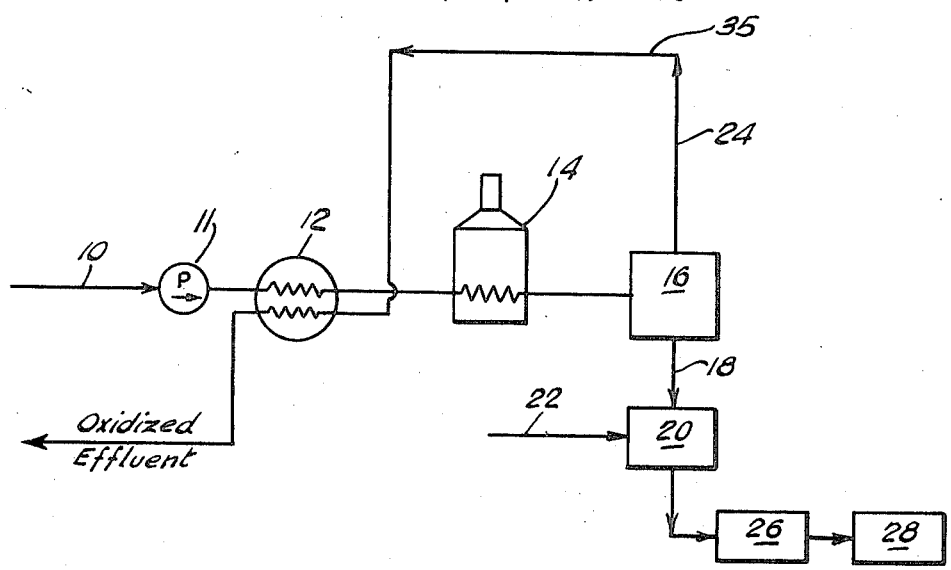
Treatment of Liquid Wastes

COKE-MAKING PROCESS AND COKE FUEL PRODUCED BY SAME

CROSS-REFERENCE

The application is a continuation-in-part of commonly assigned application Ser. No. 780,078, filed Nov. 29, 1968 in the name of applicants herein.

FIELD OF INVENTION

The invention sought to be patented by the present application is directed to a novel form of coke which is particularly useful for certain applications where a substantially odorless fuel is needed and where it is desired to avoid air pollution.

PRIOR ART

In application Ser. No. 780,078 there is disclosed and claimed a process for treating waste liquors such as those from food canning plants and from sulfite pulp processes by heating the liquors under pressure to a temperature in the range of 400° to 700° F. for a period of 0.5 minutes to 2 hours to form a solid carbonized product which is separated from the treated liquor. The treated liquor is then oxidized with air to yield an effluent aqueous liquid having a relatively low oxygen demand and which is suitable for disposal in lakes or streams without resulting in water pollution.

SUMMARY AND OBJECTS

In accord with the present invention, it has now been discovered that certain waste liquors can be treated by the process disclosed and claimed in said application Ser. No. 780,078 to form coke which is eminently useful as a fuel.

Thus, the main object of this invention is to provide a novel process for manufacturing a fuel consisting essentially of coke particles agglomerated with a heat-sensitive binder; this fuel having suitable ignition and burning characteristics without the addition thereto of any oxidizer.

A related object of the present invention is to provide a shaped fuel particularly suitable for open flame cooking and for heating orchards.

An equally important object of the present invention is to provide a process which will simultaneously lead to a useful product and which also disposes of waste carbohydrates such as fruit and vegetable peels, whey, straw, sawdust and newsprint.

DESCRIPTION

The process whereby the foregoing objects are attained comprises essentially slurrying waste carbohydrates in water; decarboxylating and carbonizing the thus-produced slurry by heating under pressure to a temperature in the range of 400° to 700° F. to form discrete nonadherent coke particles, mixing said particles with about 1 to about 10 weight percent of a heat-sensitive binder and shaping the resulting mixture to useful fuel form.

The coke produced by the above process has a specific gravity of about 1.3, a sulfur content of not more than 0.43 weight percent, a hydrogen content of at least 4.9 weight percent and a surface area of 8 to 16 sq. meters per gram. This coke once ignited will completely burn in air to a white ash.

The coke produced by the present invention has a reduced sulfur content so that it will not contribute materially to air pollution nor will it give any unpleasant odor to food when used for open flame cooking. The coke of the invention is advantageous also in this particular application because it is readily ignited by means of a match. Unlike cokes produced from petroleum which are largely composed of highly condensed aromatic substances, some of which may be carcinogenic, the coke of the present invention is not aromatic in character since it is produced by the decarboxylation and carbonization of carbohydrates under process conditions which would not produce petroleum coke.

The process of the claimed invention will be better understood by reference to the accompanying FIGURE which illustrates diagrammatically a preferred embodiment of the claimed invention.

With reference to the figure, an aqueous slurry of the particular waste material is passed from line 10 by pump 11 through heater 12 where it is preheated by heat exchange with hot recycle liquor from a source described hereinafter. The preheated waste slurry or liquor is then fed into fired heater 14 where its temperature is raised to the desired coking temperature in the range of 400° to 700° F. at a pressure in the range of 300 to 3,500 p.s.i.g. sufficient to prevent vaporization of water. Preferred operating conditions include a temperature of about 550° F. and a pressure of 1,000 p.s.i.g. The hot waste liquor is then introduced into a coke drum 16 which is a large pressure vessel suitable for holding the heated waste liquor at the desired processing temperature and pressure preferably for a period of 20 minutes to 2 hours.

During the coking process organic components of the waste liquor are converted to coke. Combined oxygen in the organic compounds is liberated as carbon dioxide and water by decarboxylation and dehydroxylation.

The coke settles from the aqueous slurry and collects in the lower part of drum 16 from which it is discharged continuously or periodically by suitable separating means through line 18 to blow tank 20 where it is air dried by air entering through line 22. The separating means above-mentioned can consist of cyclones, filters, settlers or centrifuges.

Effluent liquor is withdrawn from the upper part of drum 16 through line 24. The effluent then is recycled through heater 12 to preheat the feed. From there, it can either be discharged to waste; recycled to form water for slurrying the waste or it can be oxidized with air under coking conditions to produce an effluent having low chemical oxygen demand (COD) more suitable for disposal in a waste stream, as described and claimed in above-mentioned, copending application Ser. No. 780,078.

The coke after drying in the blow tank is in fine, fluffy, relatively light, small, nonadherent, particulate form, since the coking reaction produces a slurry of small particles which are separated from one another by a surrounding film of water. At this point the coke may be used as a fuel. However, for easier handling, it is preferred to form it into briquets or other shapes. The coke is preferably at least air dried before mixing with a binder or else is mixed with the binder at a temperature high enough to drive off most of the water. Then, the particulate material is fed to a mixer 26 to which a heat-sensitive binder is also supplied in an amount of about 1 to 10 weight percent basis coke. A preferred binder is a petroleum wax but other binders such as starch, pitch, or tar, or similar materials used in the art can also be used. Whatever the binder selected, it should be borne in mind that it need have a low sulfur content so as not to contribute to air pollution when it burns.

After intimate commingling, at a temperature sufficient to soften or melt the binder, the coke-binder blend is fed to a shaping device 28 such as a pelletizer or extruder and formed into agglomerates such as pellets or extrudates having the desired size.

The following examples further illustrate the claimed process. Except for the whey liquid, the feeds were obtained by slurrying orange peels, sawdust, straw, potato peels and newsprint with water in a Waring blender. The slurries were then charged to a vertical autoclave which was heated under autogenous pressure for the prescribed time and the contents were recovered and analyzed. Table I shows the results obtained by coking the various charges under varying conditions.

Table II below shows an analysis of cokes produced from various materials.

It will be noted from Table II that the cokes produced by the method of the invention have a heating value in the range of bituminous coal.

In contrast to the cokes of the invention, petroleum cokes cannot be ignited with a match or by heating in a beaker on a hot plate (an arrangement equivalent to an orchard heater).

TABLE I.—COKING OF VARIOUS WASTES

| | Yield, weight percent | Solids, weight percent | COD, mg./ O₂/liter | Gross heat of combus., B.t.u./lb. | Density | Conditions |
|---|---|---|---|---|---|---|
| 1. Potato waste in water | | 4.21 | 39,700 | | | 550° F. |
| Liquid product | 97.0 | 1.16 | 14,810 | | | 1,075 p.s.i.g. |
| Coke | 1.7 | | | 12,940 | | 2 hours. |
| Gas (by diff.) | 1.3 | | | | | |
| 2. Orange waste in water | | 9.6 | 122,000 | | | 550° F. |
| Liquid product | 88.5 | 0.44 | 26,970 | | | 1,100 p.s.i.g. |
| Coke | 4.1 | | | 13,192 | 1.3284 | 2 hours. |
| Gas (by diff.) | 7.4 | | | | | |
| 3. Orange waste in water | | 10.8 | 100,000 | | | 400° F. |
| Liquid product | 89.7 | 2.08 | 29,240 | | | 300 p.s.i.g. |
| Coke | 7.4 | | | 10,303 | 1.3714 | 2 hours. |
| Gas (by diff.) | 2.9 | (98.6% CO₂) | | | | |
| 4. Whey liquid | | 5.2 | 56,800 | | | 550° F. |
| Liquid product | 90.2 | 1.1 | 12,390 | | | 1,050 p.s.i.g. |
| Coke | 1.7 | | | 12,722 | | 2 hours. |
| Gas (by diff.) | 8.1 | (94% CO₂—4.1% H₂) | | | | |
| 5. Straw (in water) | | 3.3 | | | | 600° F. |
| Liquid product | | | 13,340 | | | 2 hours. |
| Coke | 2.9 | | | 12,586 | | 1,550 p.s.i.g. |
| Gas | | | | | | |
| 6. Newsprint in water | | 5.8 | | | | 650° F. |
| Liquid product | 90.6 | | 12,600 | | | 1,650 p.s.i.g. |
| Coke | 1.9 | | | 12,800 | | 2 hours. |
| Gas (by diff.) | 7.5 | (98.5% CO₂) | | | | |
| 7. Sawdust in water | | | | | | |
| Liquid | | | 19,060 | | | |
| Coke | 5.5 | | | 12,380 | | 550° F. |
| Gas | (98.5% CO₂) | | | | | |

TABLE II.—COKES PRODUCED FROM VARIOUS MATERIALS BY COKING IN A LIQUID AQUEOUS PHASE UNDER PRESSURE

| Coke source | Weight percent | | | | | | | Gross heat of combus. B.t.u./lb. |
|---|---|---|---|---|---|---|---|---|
| | Ash | Carbon | Hydrogen | Sulfur | Nitrogen | Phosphorus | Potassium | |
| Potato waste | 1.0 | 72.3 | 5.8 | <0.1 | 3.9 | 0.1 | 0.2 | 12,900 |
| Orange waste | 2.5 | 72.6 | 6.2 | <0.1 | 1.6 | 0.2 | 0.1 | 13,200 |
| Sawdust | 0.54 | 70.1 | 4.9 | <0.1 | 0.9 | | | 12,388 |
| Newsprint | 0.73 | 69.6 | 5.0 | 0.35 | 0.23 | | | 12,800 |
| Straw | 4.6 | 71.7 | 4.9 | 0.13 | 1.0 | | | 12,586 |
| Whey liquid | 0.6 | 70.8 | 5.5 | 0.43 | 2.5 | 1.2 | 0.08 | 12,772 |

Once ignited in air petroleum cokes will not continue to burn unless additional fuel is added. It is believed that these differences in burning properties are due to the respective methods of manufacture. The petroleum cokes are produced in hydrocarbon media by putting down layer after layer of material on a coke nucleus so that relatively large dense particles are produced having a surface area of only 2–4 sq. meters per gram. Estimating from the analyses, it can be deduced that the cokes described here have about 70 percent more oxygen than the petroleum cokes.

It will be appreciated that the process and product of this invention are of interest in several industries where wastes of the type with which this invention is concerned are produced.

The invention is of particular interest to the citrus growing industry since it succeeds in disposing of an undesirable waste and in simultaneously producing a fuel product which is useful for heating orchards.

It will be understood that this invention is susceptible to modification in order to adapt it to different usages and conditions and, accordingly, it is desired to comprehend such modifications within this invention as may fall within the scope of the appended claims.

What is claimed is:

1. A coke fuel produced by heating an aqueous slurry containing carbohydrate wastes to a temperature in the range of about 400° F. to about 700° F. under autogenous pressure for a time sufficient to substantially completely decarboxylate, dehydroxylate and carbonize said carbohydrate wastes, said fuel having a sulfur content below 0.5 percent by weight, a density of about 1.3, a carbon content ranging from about 69 to 73 percent by weight, a heating value of at least 12,500 BTU's per pound and a surface area of about 8 to about 16 sq. meters per gram.

2. A shaped coke product according to claim 1 in combination with a binder of the group of petroleum wax, starch, pitch and tar.

3. A shaped coke product according to claim 2 wherein said binder is a petroleum wax.

4. A shaped coke product according to claim 2 wherein said binder is pitch or tar.

* * * * *